Figure 6:
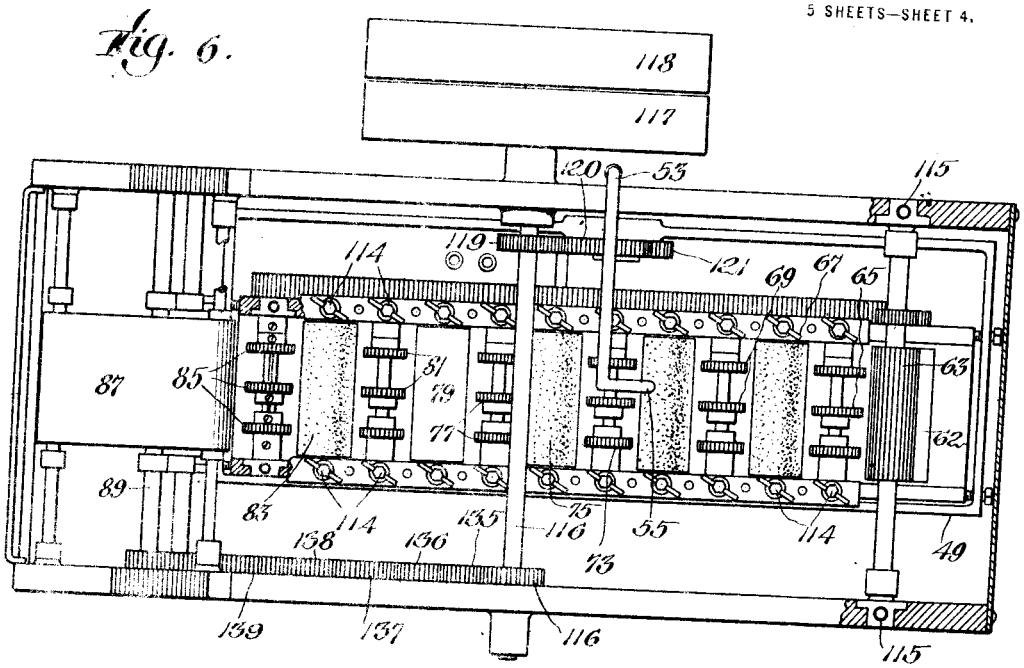

G. BASLER.
MACHINE FOR RENDERING SOLES FLEXIBLE.
APPLICATION FILED AUG. 14, 1914.
1,175,680.
Patented Mar. 14, 1916.
5 SHEETS—SHEET 1.
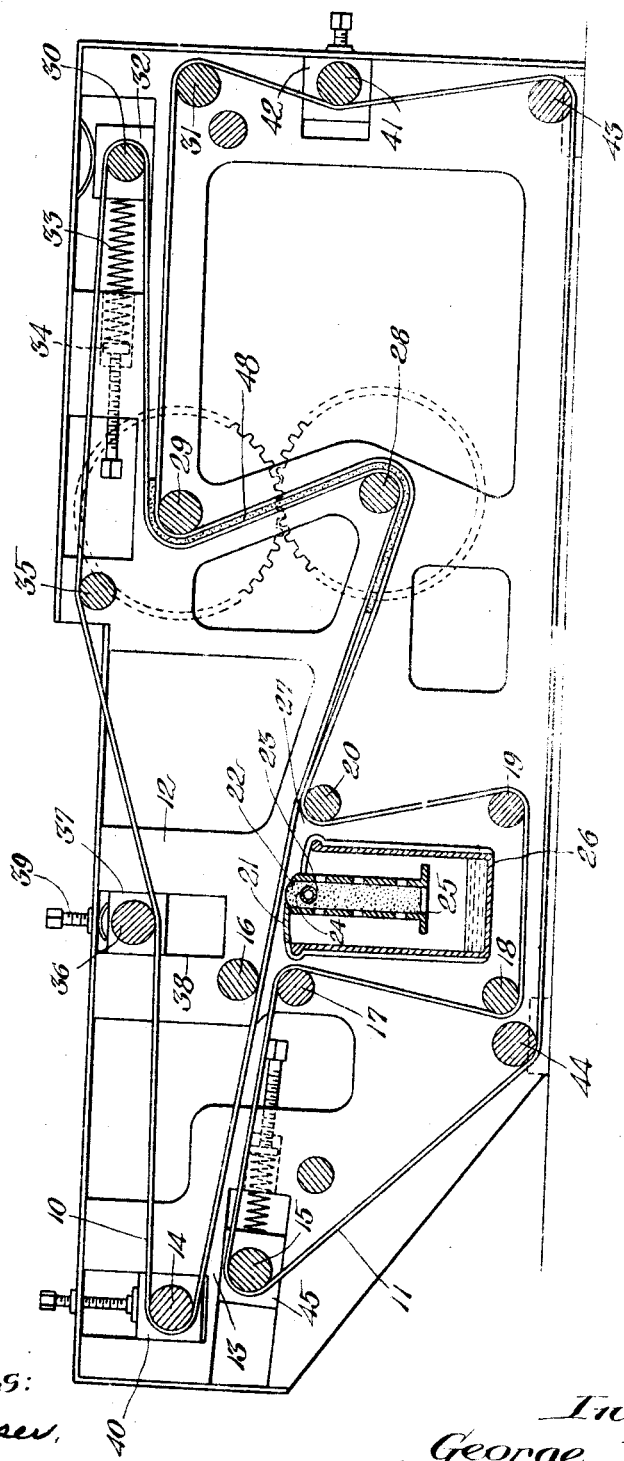
Witnesses:
H. C. Bowser,
L. B. Weymouth.
Inventor:
George Basler,
by Geo. W. Maxwell,
Attorney

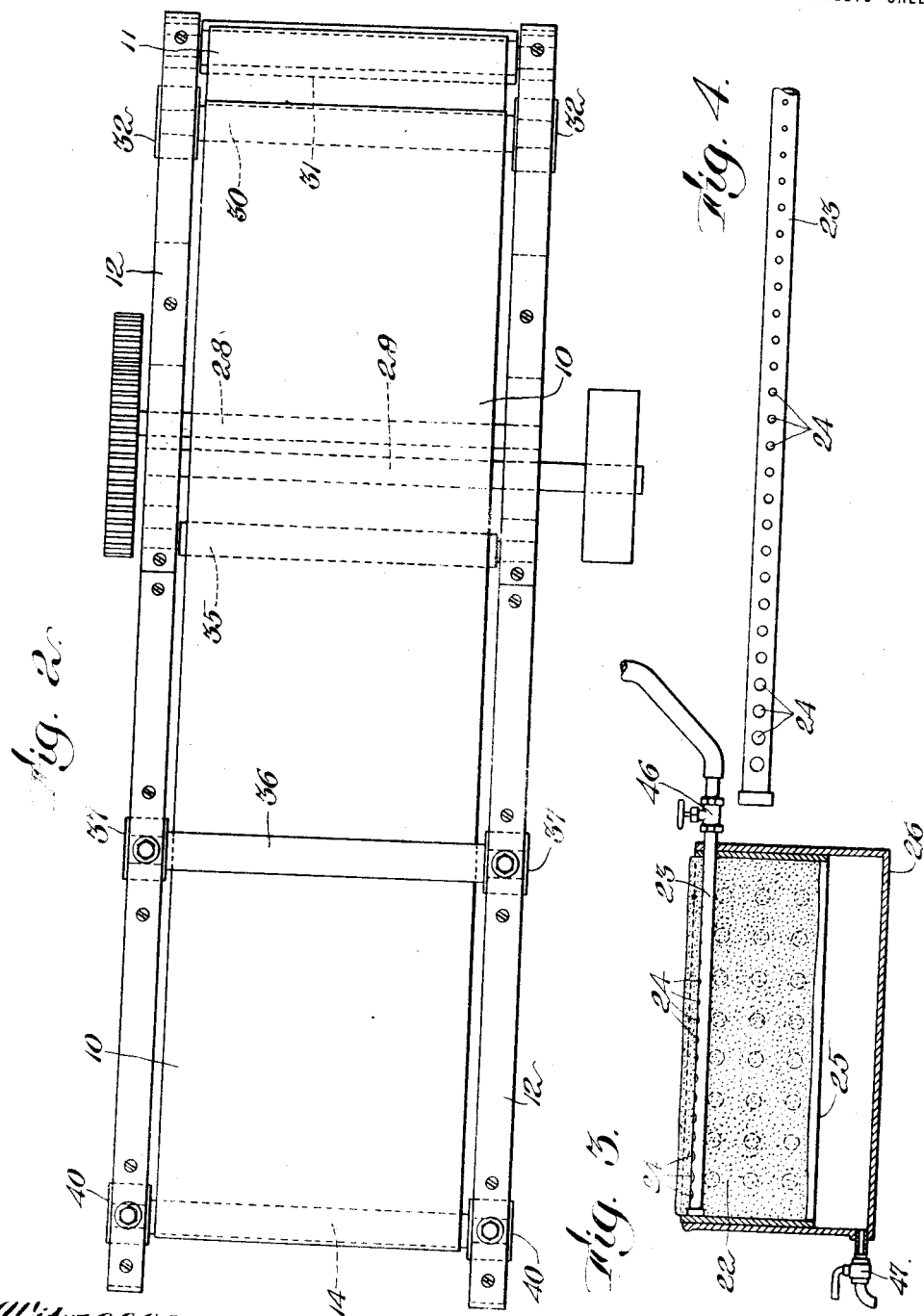

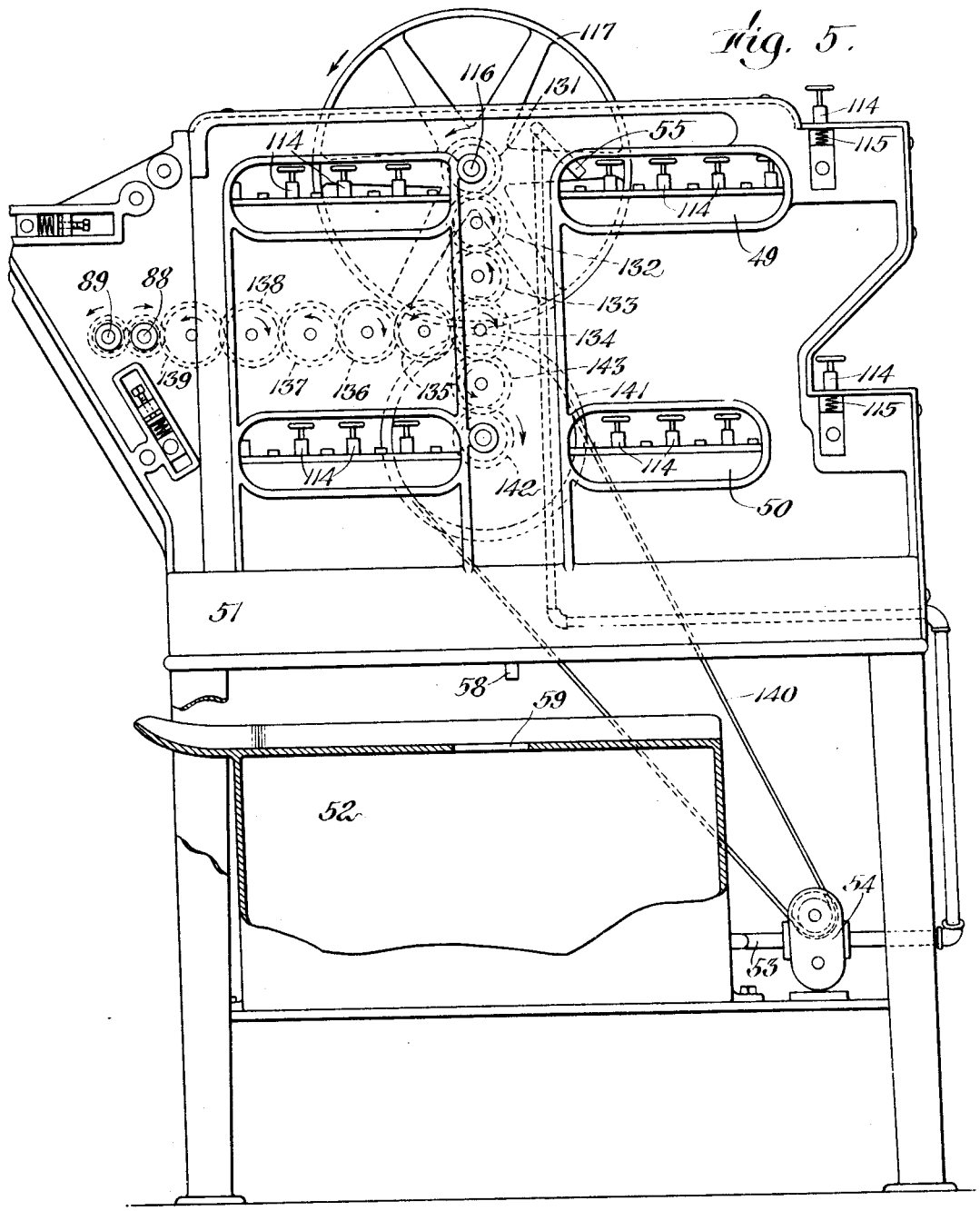

G. BASLER.
MACHINE FOR RENDERING SOLES FLEXIBLE.
APPLICATION FILED AUG. 14, 1914.

1,175,680.

Patented Mar. 14, 1916.
5 SHEETS—SHEET 4.

Witnesses:
A. C. Bowser
L. B. Weymouth

Inventor:
George Basler,
by Geo. W. Maxwell,
Attorneys

G. BASLER.
MACHINE FOR RENDERING SOLES FLEXIBLE.
APPLICATION FILED AUG. 14, 1914.

1,175,680.

Patented Mar. 14, 1916.
5 SHEETS—SHEET 5.

Witnesses:
A. C. Bowser,
L. B. Weymouth.

Inventor:
George Basler,
by Geo. H. Maxwell,
Attorney.

UNITED STATES PATENT OFFICE.

GEORGE BASLER, OF LYNN, MASSACHUSETTS, ASSIGNOR TO BASLER MACHINERY COMPANY, OF LYNN, MASSACHUSETTS, A CORPORATION OF MAINE.

MACHINE FOR RENDERING SOLES FLEXIBLE.

1,175,680.  Specification of Letters Patent.  Patented Mar. 14, 1916.

Continuation in part (Figs. 1 to 4) of application Serial No. 659,739, filed November 11, 1911. This application filed August 14, 1914. Serial No. 856,803.

*To all whom it may concern:*

Be it known that I, GEORGE BASLER, a citizen of the United States, and resident of Lynn, county of Essex, State of Massachusetts, have invented an Improvement in Machines for Rendering Soles Flexible, of which the following description, in connection with the accompanying drawings, is a specification, like letters on the drawings representing like parts.

In the manufacture of shoes there has recently been a pronounced tendency to require extreme flexibility of the sole, and I have discovered that by placing the sole, in-sole, or tap, as the case may be, between two similarly moving surfaces, as for instance, two belts, and then flexing the sole while still retained by and moving with said belts or surfaces over a small roll for instance, whereby the leather is extremely flexed in at least one direction, and preferably also in a reverse direction, the tendency and liability of injuring the leather, as by stretching, creasing, etc., which has attended the attempts hitherto to flex soles by frictionally bending them around and in engagement with a bar or the like, is eliminated, and I have further found that this flexing, softening and pliability is still further increased to a remarkable degree by accomplishing the bending as aforesaid in the presence of water or other tempering liquid. These two features viz., first, applying a tempering liquid to one side, preferably the grain side, of the leather just as it is about to be put through the bending process, and second, accomplishing the bending of the leather, not in sliding engagement with anything, but rather kept in non-sliding engagement between two surfaces while the bending and softening process is taking place, produce an extreme and permanent flexibility and softening of the leather without any tendency to stretch, strain, crease or otherwise injure the natural fiber and quality of the leather. Also by bending the moistened and tempered surface of the leather backward, so as to place it under tension sufficient to open the pores and later restoring it to its normal plane condition, the tempered surface is opened and stretched and a relative play or give of the fibrous texture brought about, so that it becomes much more pliable and more suitable for shoe manufacture.

My invention provides an improved apparatus for effecting these operations in this preferred illustrative manner and sequence, but to the broader aspects of the invention, the particular sequence of operations, or the specific manner in which they are performed, is not material.

The present application is a continuation in part of my prior application, Serial No. 659,739, filed November 11, 1911, being co-pending with my Patent No. 1,036,061, dated August 20, 1912, and filed March 15, 1912, wherein the combination of flexing and stretching means such as a pair of belts, together with tempering means, is claimed. In the present application, the combination of any simultaneously operating sole flexing and moistening means is claimed, together with simultaneously operating, bending, conveying, and tempering means for soles or leather. Preferably, the conveying devices are also the flexing or bending means, as illustrated in improved machine constituting the modified form shown in the present application, such conveying and bending instrumentalities undulating the leather while the tempering solution is applied thereto at one or more points in the machine.

Although I find that it is usually sufficient to first apply tempering liquid to a sole and then to subject the sole to the bending or flexing operation, I find that it is also desirable to again subject the sole to a tempering bath, and accordingly, I have illustrated in one form of the invention, a machine having a plurality of moisture-applying tanks. I may pass the sole over or through one tempering tank, then through the breaking or flexing and bending operation, and then again through a second tempering tank, although I prefer to also provide bending or opening devices in each tank, so that, as the sole is receiving its tempering treatment, it will also be subjected to a transverse bending or working to facilitate its absorption of the tempering liquid. The first application of the tempering liquid tends to permeate the grain surface of the leather, and prevent its cracking when it is put through the breaking or flexing operation, and the second application of the tempering liquid after the sole is thus flexed more quickly and fully permeates the stock, so as to insure permanent flexibility. Furthermore, by having a plurality of tempering stations a sole can be fed by or through more quickly, and still receive an ample treatment.

A still further feature in the form of machine, comprising a plurality of tempering points, is that I can arrange for a circulation of the tempering solution, thus keeping the tempering solution in agitation, so that it will always be in proper condition and the ingredients thoroughly mixed.

Other advantages and features of the modified form are that an adjustment of the height of the liquid is arranged to give the desired amount of tempering, that the conveying and breaking belts are kept free of the solution while the sole is fed in the tempering tanks by other means, and that all surplus tempering liquid is positively removed from the sole before it leaves the machine, so that the sole or leather can be instantly handled, and there is no dripping of the solution from the sole, or other waste.

Other features of the invention, details of construction, and novel combinations of parts will be hereinafter more fully pointed out and claimed.

Figure 7:
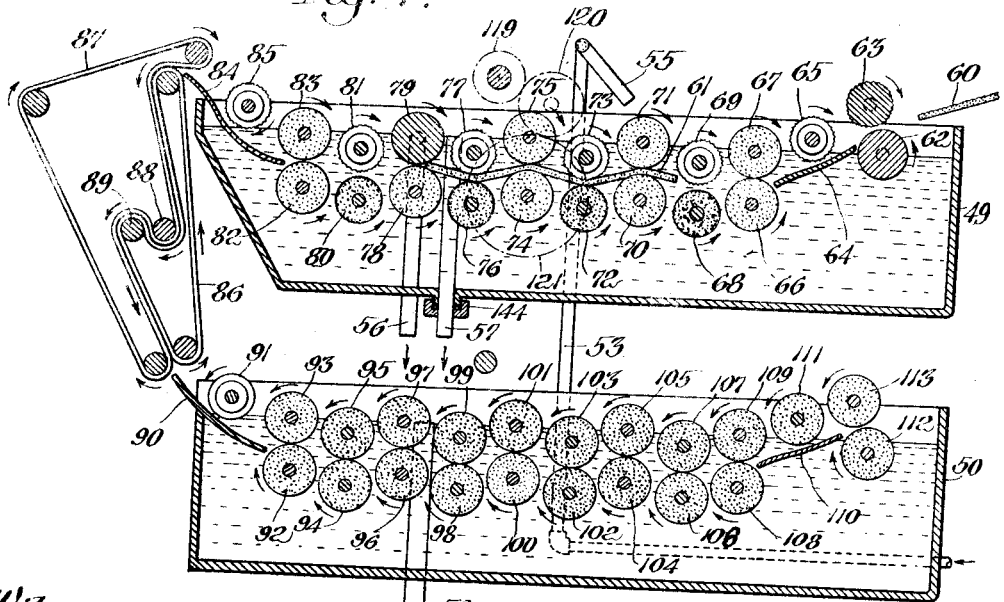
Figure 9:
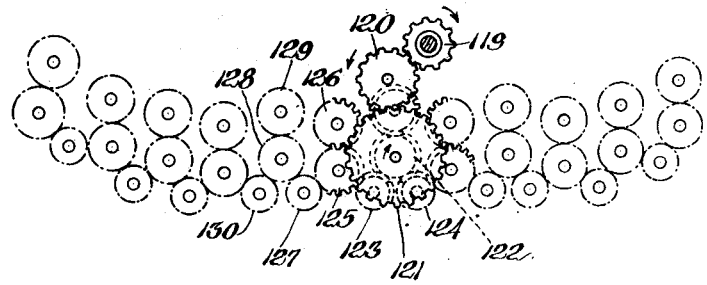
Figure 8:
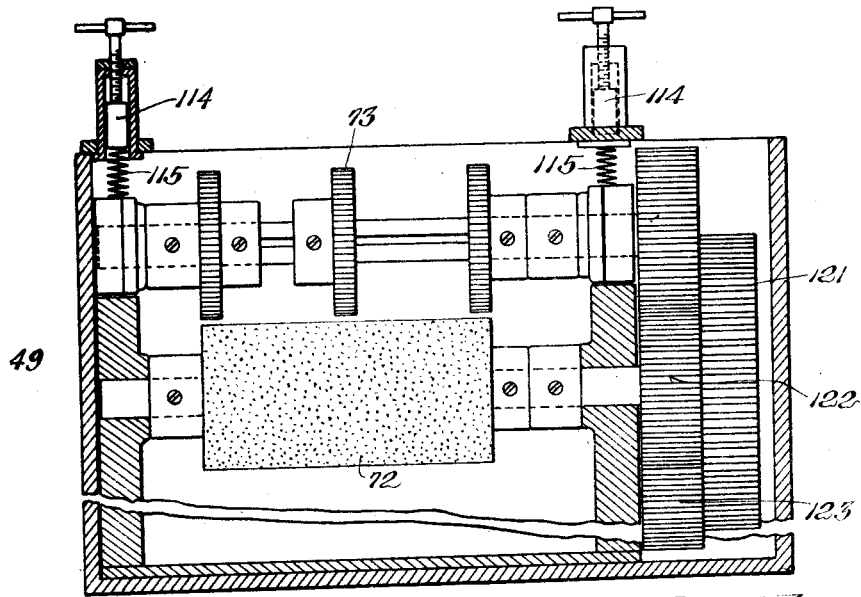

Referring to the drawings, Figure 1 is a longitudinal vertical section through the apparatus; Fig. 2 is a plan view thereof; Fig. 3 is a transverse vertical section through the device for applying tempering liquid at right angles to Fig. 1; and Fig. 4 is a detail elevation of the pipe which supplies the liquid. Figs. 1-4 are derived from my application Serial No. 659,739 before mentioned. A modified form of the invention is illustrated in Figs. 5 to 9, wherein Fig. 5 is a side view of my machine with the tempering stations, the supply reservoir being partly shown in cross section; Fig. 6 is a plan view of the machine; Fig. 7 is a cross sectional view through the tempering tanks; Fig. 8 is an end view; and Fig. 9 is a diagrammatic view of the gearing to rotate the various feeding rolls within the tanks.

In the preferred embodiment of the invention shown, the soles or other pieces of stock to be treated are fed through the machine by two coöperating belts 10, 11, which also grip the soles between them for the flexing operation. These two belts are mounted on a system of rollers carried by a suitable, horizontally extending frame 12 and held taut by suitable tension devices. The belts, which may be of leather or other suitable material, are of a suitable width, and, at the receiving end of the machine shown at the left in Fig. 1, have portions arranged in substantial parallelism or slightly converging to leave between them a receiving throat 13 of a width adapted to receive and engage the soles inserted therein. The belts which, at the receiving end of the machine, are passed around rollers 14, 15, extend along in substantial parallelism some distance to form the receiving throat to the opposite rollers 16, 17 and the belt 11 is then bent downward about the roller 17 around spaced apart rollers 18, 19 on the lower part of the frame and up around roller 20 to leave a space for the liquid supply for tempering the soles. From between the rollers 16, 17 the belts advance the soles along over a guide plate 21 to pass over the top of a piece of felt or the like 22, which is kept constantly saturated with water or other suitable tempering fluid from a supply pipe 23 having a series of openings 24 in the top thereof. As seen in Fig. 4, the openings 24 are of progressively increasing size from the inlet end of the pipe to make up for the decreasing pressure. The upper belt 10 extends along closely over the top of felt pad 22 so that the soles are uniformly and evenly pressed thereby against the saturated surface of the felt and thus an even, definite moistening thereof is effected. The felt pad 22 may be mounted in a suitable holder 25 in a receptacle 26 adapted to catch the surplus water. The roller 20 is mounted just beyond the pad 22 in position so that both the belts 10 and 11 are pressed thereagainst and as the belt 11 extends upward to join the belt 10 at this point, a receiving mouth 27 is provided in which the sole is caught after passing the moistening pad. Thence the two belts together, and both held taut, pass around roller 28, which is of relatively small radius, in engagement with substantially one-half the circumference thereof, so that the sides of the soles just moistened are bent outward and flexed so as to open and stretch the same, while held closely embraced at all parts on both sides by the belts, so that creasing or humping up of the leather is prevented. Thence the belts are passed with a reverse bend around roller 29 whereby the other sides of the soles are flexed and bent outward, still being held strongly embraced at both sides by the belts. Thence the belts extend in diverging relation around their respective rollers 30, 31 at the rear reaches thereof. The roller 30 of the belt 10 is shown mounted in blocks yieldingly pressed outward to hold the belt taut by springs 33, the tension of which may be varied by adjustable backings 34. Thence the belt 10 passes over guide roller 35 and under guide roller 36, the latter being mounted in bearing blocks 37 adjustable in slots 38 by means of screw bolts 39 threaded in the frame so as to enable a positive adjustment of the belt tension. Thence the belt, 10 passes at the receiving end of the machine around roller 14 which is mounted in bearing blocks 40 adjustable similarly to the blocks 37 to vary the width of the receiving throat 13. The belt 11 from roller 31 passes downward around a roller 41 mounted in adjustable bearing blocks 42 similarly to the roller 36 to positively adjust the tension of this belt. Thence it passes around guide rollers 43 and 44 back to roller 15, which is mounted in bearing blocks 45 pressed outward under a variable spring tension similarly to the block 32, so that the tension on this belt, as well as that on the belt 10, may always be maintained practically uniform. The supply of water to the pipe 23 may be regulated by a suitable valve 46 and the accumulated surplus water may be drawn off from the tank 26 by a suitable valve cock 47. In Fig. 1 a sole 48 of average length is illustrated in the machine.

I consider the special arrangement of the moistening means relative to the flexing means to be an important feature of invention, since I have discovered that when the leather is moistened just before the mechanical flexing, this opening and stretching by the bending and working of the leather is better performed and less liable to result in creasing and humping up the leather, and with the coöperation of the belts pressing strongly upon the leather at both sides this creasing distortion is practically eliminated. I have found further that the flexing and working of the soles immediately after they are moistened results in a greater permanent flexibility of the stock than would otherwise follow. It is also to be noted that in the operation of the apparatus the even distribution of the water, or, tempering solution over the surface of the soles is insured in the maximum quantity that the soles are capable of absorbing, not only by reason of the continuous pressure supply and the action of the felt pad in spreading the same, but as the soles are tightly pressed between the belts and around the rollers the moisture tends to spread evenly over the soles in the working and flexing thereof so that the tendency to spotting of the leather from uneven wetting thereof is avoided. The particular embodiment of the invention, as thus far explained, and as illustrated by the machine of Figs. 1 and 2, constitutes a continuation of my prior application Serial No. 659,789, filed November 11, 1911.

Referring to my machine of Figs. 5–8 which presents further improvements in this art whereby greater speed and efficiency are secured and a better product turned out, it will be noted that instead of one moistening device I have provided a plurality, and instead of applying the softening and moistening fluid at one point, I apply it throughout the full extent of the sole, and instead of applying it on one side only, I apply it on both sides, preferably by actually immersing the sole. Furthermore, I do not stop with simply applying the fluid, but I work the fluid into the sole by a more or less rapid agitation of the sole, preferably by slightly bending the sole rapidly back and forth so as thereby to open the pores of the sole on its opposite sides while it is receiving the moisture. Preferably and as herein shown, this preliminary opening and tempering or initial preparation of the sole is accomplished by passing the sole through an upper tank between positively driven feeding and moisture-applying devices. The sole is then automatically treated to the bending and flexing or breaking process, the same as in the more simple form of my machine previously described, one simple embodiment of the belt carrier form of flexing and breaking mechanism being shown, which if desired may be precisely the same as already described in connection with Fig. 1. Preferably the sole, or other piece of leather, passes automatically from its sharp bending or breaking operation to a further moistening treatment herein shown as provided by a tank containing means somewhat similar to that contained in the upper tank. The provision of a plurality of moistening stations with an intervening flexing and breaking mechanism permits much greater speed because of the thoroughness and facility with which the wetting and bending takes place, and permits the soles to be fed rapidly, abutting each other. Preferably also I provide means at the outgoing end of the machine for removing the surplus solution from the soles, and also I provide a special circulation system and means for keeping the mixture in constant agitation.

I have indicated an upper tank 49 and a lower tank 50 mounted in a stand or frame 51 which also contains a reservoir 52 from which leads a supply pipe 53 provided with a pump 54 for delivering the solution at the upper end 55 of the pump into the upper tank, whence the fluid flows by overflow pipes 56, 57 into the lower tank 50 and thence by another overflow pipe 58 into the supply tank 52 through an opening 59. A sole 60 is indicated in Fig. 7, as about to enter the machine, and another sole 61 is shown already in the machine. These soles pass between pairs of moisture-applying rolls of felt or other suitable material and construction and in connection preferably with feeding wheels or similar devices arranged to operate on the flesh side of the stock herein shown as the upper side (so as not to scratch or injure the grain side). As herein shown, I have provided a felt roll 62 and an opposite corrugated feeding roll 63 for delivering the sole on to a guide plate 64 and beneath feeding wheels 65 and thence to a pair of felt rolls 66, 67 and thence to a series of felt rolls alternating with upper feed wheels and an under felt roll and lettered for convenience of designation as 68, 69, 70, 71, 72, 73, 74, 75, 76, 77, 78, 79, 80, 81, 82, and 83. One of these, the roll 79, is hard, preferably metal, or wood, to give greater squeezing pressure at this point and act to iron out the flesh side. At the delivery end of the tank is a feed apron or guide 84 and feed-wheels 85. The two belts or webs are indicated at 86, 87 and the sole flexing or bending and breaking rollers at 88, 89 corresponding to the rollers 28, 29. It will be understood that I do not use the word breaking to indicate a cracking, as it is the express object of my invention to avoid the liability of cracking the leather, but I use the word breaking to indicate a sharp or severe bending as distinguished from a slight bending. The bending which is accomplished by the rollers 88, 89 is sufficient to give a permanent flexibility to the sole because of the bending. This has already been explained in connection with the more simple form of apparatus of Figs. 1-4. From the outgoing end of the flexing belts 86, 87 the sole is delivered to a guide plate or receiving apron 90 down which it is compelled to move properly by a feed device 91 and enter between a series of moisture-applying rollers of felt or other suitable material arranged in staggered order, so as to continue the opening and softening process in very much the same manner as previously performed in the upper tank, these rollers being indicated by the numerals 92, 93, 94, 95, 96, 97, 98, 99, 100, 101, 102, 103, 104, 105, 106, 107, 108 and 109. From the rollers 108 and 109 the stock is delivered to an upwardly extending guide plate 110 beneath a roll 111 to a pair of squeezing rollers 112, 113, which operate on the sole above the surface of the solution so as to remove surplus moisture but not to such an extent as to dry the soles. The various rolls and feeding devices are made yielding to accommodate different thicknesses of stock and for adjustment to suit tempering conditions and for this purpose I have indicated adjusting devices 114 and springs 115 for the various pairs of leather engaging devices. Any suitable driving mechanism may be employed and it will be understood that I have not undertaken to show the same in finished detail, but have indicated a main driving shaft 116 provided with usual fast and loose pulleys 117, 118 and a train of gears 119, 120, 121, 122, 123, 124, 125, 126, 127, 128, 129, 130, etc., as indicated diagrammatically in Fig. 9 for positively driving the rolls and feeding devices and gears 131, see Fig. 5, 132, 133, 134, 135, 136, 137, 138 and 139 for driving the breaker rollers or flexing devices 88, 89, the pump 54 being shown as driven by the belt 140 and pulley 141 connected by gears 142, 143 to the gear 134. The height of the liquid may be regulated by any suitable means or at least it is quite desirable that the height of the liquid in the upper tank shall be regulated, and for this purpose I have shown the pipe 57 as capable of being adjusted up and down by a nut 144.

In use one sole 60 is fed into the upper tank right after another in close succession abutting against each other, and as rapidly as the operator can feed them and the rolls can take care of them, each sole entering between the first pair of rollers 62, 63 and being thence fed through the upper tank as shown in Fig. 7, in the midst of the softening solution which is caused to permeate the pores of the leather to a high degree by the gentle bending or working of the leather up and down on both sides as it passes through the liquid and under the pressing and soaking influence of the successive moisture-providing rollers. This is accomplished quickly and thoroughly and the sole is then seized by the belts 86, 87 draining out most of the surplus moisture on to the guide plate 84 and quickly passes down to the sharp flexing or breaking members 88, 89 which give each sole a sharp progressive bending motion once each way only, i. e. each sole is bent sharply and progressively along its skin surface in such a direction as to place the latter under tension or opening strain, and is then, and preferably simultaneously, bent sharply and progressively along its flesh surface in such a direction as to place the latter under tension or opening strain, and then proceeds immediately, while thus stretched open and softened in the highest degree, to the lower tank where it is again treated to a still further and more thorough kneading or gentle bending up and down in the presence of the moistening fluid on both sides and by means of the rolls or other devices for forcing and working the moisture into the pores to the best advantage, until finally the sole at the outgoing end of the tank is drained and gently freed of its surplus moisture, so that it will not drip or waste the solution, but yet will retain a maximum softness and permeating load of moisture. The treatment in the upper tank or moistening station renders the sole as soft and moist as it is possible to render it without the sharp flexing, and then this thoroughly softened sole is immediately subjected to a progressive U-bend which opens up its grain side with the peculiar pulling stretching and working movement already described and simultaneously subjects the flesh side to a similar sharp U-bend progressively from end to end of the sole, these two U-bends being sufficiently close to each other to maintain the sole bent sharply like a letter S, as it is fed forward so that the leather is mechanically softened and the moisture is caused to enter still deeper and permeate the leather more thoroughly, and then with the leather in this mechanically softened and manipulated state, the sole is instantly plunged into the second tank and worked thoroughly by the kneading operation of the felt rolls before the leather has had a chance to contract or lose any of the benefit of the S-bending referred to. The depth of the liquid, and hence to some extent the moisture-applying conditions of the upper tank, is regulated by moving one or both of the overflow pipes 56, 57 vertically, as by adjusting the pipe 57 by means of the nut 144.

As already stated, my invention, both in its more simple form of Figs. 1–4 and in the more complete form of Figs. 5–9, is capable of a wide variety of mechanical embodiments, and accordingly I do not limit the same to the details herein set forth, excepting as otherwise required in the claims.

Having described my invention, what I claim as new and desire to secure by Letters Patent is:

1. An apparatus of the kind described, comprising a conveyer system, and a member having a surface formed as an arc of a small radius over which a portion of the conveyer system is guided, the conveyer system presenting smooth, substantially continuous surfaces to press evenly upon all portions of both sides of the articles being treated as they are bent, and having provision for being drawn over said member in a taut condition with a change of direction.

2. An apparatus of the kind described, comprising a pair of movable belt portions mounted to pass around a support formed on an arc of small radius with one belt over the other, and means for holding said belts taut, the parts being arranged to permit articles of the kind described to be fed in between said belts to be flexed about said arc of small radius.

3. An apparatus of the kind described, comprising a pair of belts having relatively small roller mountings arranged for both belts to pass around each of said mountings with one belt over the other together in reverse directions successively so that they are bent about arcs of small radii, and means for holding the belts taut, the belts being adapted to engage and grip between them articles of the kind described, and to flex the same about said roller mountings.

4. A sole flexing machine, having, in combination, two endless belts having a portion of their surfaces in contact and adapted to support a sole between them, means for advancing said belts and sole, and a series of rolls coöperating with the contacting portion of the belts to deflect said portion in opposite directions as it is advanced.

5. A sole flexing machine, having, in combination, two endless belts having a portion of their surfaces in contact and adapted to support a sole between them, means for advancing said belts and sole, a series of rolls coöperating with the contacting portion of the belts to deflect said portion in opposite directions as it is advanced, and yielding belt tightening devices to permit the belts to accommodate themselves to the thickness of the sole supported between them.

6. A sole flexing machine, having, in combination, two endless belts having a portion of their surfaces in contact and adapted to support a sole between them, a series of rolls coöperating with the contacting portion of the belts to deflect said portion in opposite directions, and means for driving the rolls to cause the belts to flex a sole supported between them.

7. A sole flexing machine, having, in combination, two endless belts between which a sole is supported, and means coöperating with said belts for deflecting them alternately in opposite directions, so arranged that different portions of the sole are bent in opposite directions at the same time.

8. A sole flexing machine, having, in combination, means for bending a sole sharply and progressively in one direction to put the grain side of the sole under severe strain, and means for bending the sole sharply and progressively in the opposite direction to put the flesh side of the sole under similar strain progressively throughout the length of the sole.

9. A sole flexing machine having, in combination, liquid applying means and means for progressively undulating a sole through said liquid applying means including means for maintaining a progressive bending in the sole from one end to the other as said sole is fed through the machine.

10. A sole flexing machine, having, in combination means for sharply and progressively flexing a sole, including mechanisms for maintaining and progressing two sharp bends in opposite directions in the form of the letter S in a sole from one end to the other as the sole is fed lengthwise through the machine.

11. A sole flexing machine having, in combination, a tank containing a liquid, means for progressively flexing a sole while immersed in the liquid, and means for thereafter undulating the sole while thus moistened.

12. A sole flexing machine, having, in combination, a plurality of sole moistening means, an intervening sharp-bending mechanism, and means for progressing the sole for successive treatments by the aforesaid means and mechanism.

13. A sole flexing machine, having, in combination, rotary moisture applying mechanism arranged to simultaneously feed and bend a sole and apply moisture thereto, and a separate device for thereafter sharply flexing the moistened sole.

14. A sole flexing machine, having, in combination, rotary moisture applying mechanism arranged to simultaneously feed and bend a sole and apply moisture thereto, a separate device for thereafter sharply flexing the moistened sole, and means to thereafter receive said flexed sole and saturate the same with moisture.

15. A sole flexing machine, having, in combination, rotary moisture applying mechanism arranged to simultaneously feed and bend a sole and apply moisture thereto, a separate device for thereafter sharply flexing the moistened sole, means to thereafter receive said flexed sole and saturate the same with moisture, and means for finally removing the surplus moisture.

16. In a sole flexing machine, a preliminary moistening tank and mechanism for positively feeding a sole through said tank, and sharp bending mechanism for receiving the sole from said tank and subjecting the same to a sharp flexing and softening movement.

17. In a sole flexing machine, a tank for moistening solution, sole feeding mechanism therein for receiving, holding, stretching, and undulating a sole progressively in said tank in the presence of said solution, and adjustable means for regulating the height of the solution in the tank.

18. In a sole flexing machine, a tank for moistening solution, mechanism therein for receiving and undulating a sole progressively in said tank in the presence of said solution, and means for regulating the height of the solution in the tank, said undulating mechanism including yielding moisture conveying rolls for simultaneously bending the leather and applying moisture to the bent surface.

19. In a sole flexing machine, a tank for moistening solution, mechanism therein for receiving and undulating a sole progressively in said tank in the presence of said solution, and means for regulating the height of the solution in the tank, said undulating mechanism including a series of yielding moisture conveying rolls and intervening feeding devices.

20. In a sole flexing machine, means for applying moisture to a sole, means for then sharply flexing the sole, and means for maintaining a continuous circulation of liquid for said moisture applying means.

21. A sole flexing machine, having, in combination, a tank to contain tempering liquid, sole flexing mechanism arranged to feed and bend a sole simultaneously while being conveyed into, through, and out of said tank, and mechanism thereafter to sharply bend said sole while continuing to feed the same.

22. A sole flexing machine, having, in combination, a tank to contain tempering liquid, sole flexing mechanism arranged to feed and bend a sole simultaneously while being conveyed into, through, and out of said tank, and mechanism thereafter to sharply bend said sole and thereafter to again convey and bend the sole and saturate the same with liquid.

23. A sole flexing machine, having, in combination, moisture applying mechanism arranged to simultaneously feed and bend a sole, and additional means for thereafter flexing the moistened sole.

24. A sole flexing machine, having, in combination, moisture applying mechanism arranged to simultaneously feed a sole while bending different parts in opposite directions at the same time.

25. In a sole flexing machine, a tank to contain moistening solution, and means to feed and undulate a sole through said tank, said means comprising pairs of sole engaging devices arranged in staggered relation to each other.

26. In a sole flexing machine a tank to contain moistening solution, means to feed and undulate a sole through said tank, said means comprising pairs of sole engaging devices arranged in staggered relation to each other, and means for positively rotating said pairs of sole engaging devices in synchronism.

27. In a sole flexing machine, a tank to contain moistening solution, and means to feed and undulate a sole through said tank, said means comprising pairs of sole engaging devices arranged in staggered relation to each other, one of each pair of said devices being yieldingly supported so as to permit successive soles of varying thickness to be acted upon to substantially the same extent.

28. A sole flexing machine having, in combination, mechanism to undulate and to moisten a sole simultaneously.

29. A sole flexing machine having, in combination, mechanism to moisten, to convey, and to undulate a sole simultaneously.

30. A sole flexing machine having mechanism to bend and convey a sole simultaneously during the application of tempering solution to said sole, in combination with means to supply said tempering solution.

In testimony whereof, I have signed my name to this specification, in the presence of two subscribing witnesses.

GEORGE BASLER.

Witnesses:
ROBT. H. SCHULZ,
R. G. HERSEY.